US005987154A

United States Patent [19]
Gibbon et al.

[11] Patent Number: 5,987,154
[45] Date of Patent: Nov. 16, 1999

[54] METHOD AND MEANS FOR DETECTING PEOPLE IN IMAGE SEQUENCES

[75] Inventors: David C. Gibbon, Jackson; Jakub Segen, Fair Haven; Behzad Shahraray, Freehold, all of N.J.

[73] Assignee: Lucent Technologies Inc., Murray Hill, N.J.

[21] Appl. No.: 08/754,910

[22] Filed: Nov. 22, 1996

Related U.S. Application Data

[63] Continuation of application No. 08/486,061, Jun. 7, 1995, abandoned, which is a continuation of application No. 08/094,286, Jul. 19, 1993, abandoned.

[51] Int. Cl.$^6$ ................................................. G06K 9/00
[52] U.S. Cl. ............................................ 382/115; 382/199
[58] Field of Search ................................... 382/115, 116, 382/117, 118, 119, 120, 124, 181, 190, 209, 312, 171, 103, 107, 142, 199, 201, 203, 204, 217, 224, 225, 226, 227, 228, 266, 268, 269, 286, 291; 340/825.34, 825.31; 902/3; 348/77, 143, 161, 171, 418; 235/382.5

[56] References Cited

U.S. PATENT DOCUMENTS

| | | | |
|---|---|---|---|
| 4,581,760 | 4/1986 | Schiller etal. | 382/124 |
| 4,975,969 | 12/1990 | Tal | 382/2 |
| 5,012,522 | 4/1991 | Lambert | 382/2 |
| 5,086,480 | 2/1992 | Sexton | 382/18 |
| 5,187,574 | 2/1993 | Kosemura et al. | 382/2 |
| 5,245,329 | 9/1993 | Gokcebay | 340/825.31 |
| 5,258,836 | 11/1993 | Murata | 348/14 |
| 5,283,644 | 2/1994 | Maeno | 348/152 |

FOREIGN PATENT DOCUMENTS 330 455 A2  2/1989  European Pat. Off.  ....... H04N 7/137

OTHER PUBLICATIONS

Shackleton et al, "a method of Processing an Image", Feb. 1992, PCT International Publication No. WO 92/02000.

Turk et al, "A Face Recognition system", May 1992, PCT Internation Publication No. WO 92/08202

Rovisec 3, Intelligent Robots, 3rd International Conf., Editors: Casasent et al., Proceedings of the SPIE, vol.449, No.2, 1984 J.Segen "Locating Randomly Oriented Objects From Partial View"pp. 676–684, Nov.7–10, 1983, Cambridge, MA, SPIE Conf., Part 2.

Proceedings of the British Machine Vision Conference, Sep.24, 1992, LEEDS pp. 488–497 T.I.P. Trew et al. "Automatic Face Location To Enhance Videophone Victure Quality", Feb. 22–24, 1992, LEEDS.

IEE Proceedings–I,vol.139, No.2, Apr. 1992, pp. 212–218 M.Soryani and R.J.Clarke "Segmented Coding of Digital Image Sequences".

Proceedings of IEEE InternationalSymposium on Circuits and Systems, vol.2, May 3, 1990, New Orleans pp.1026–1029 A.M. Alattar and S.A. Rajala "Knowledge–Based System for Coding Head and Shoulder Images" 1990 IEEE Conference, Sheraton Hotel, New Orleans, Louisiana, May 1–3, 1990.

Proceedings of the SPIE, No. 1658, Feb. 14, 1992 pp. 151–164 G.G.Gordon and L.Vincent "Application of Morphology of Feature Extraction For Face Recognition" (Editors: Dougherty et al.), Feb. 12–13, 1992, (San Jose, Calif.) SPIE Conference, vol. 1658, Non–Linear Image Processing III (1992).

Proceedings of IASTED International Symposium,1989 pp. 84–88 M.Alderighi "Design Study of A Prototypal Video Tracking System" (No place of publication).

*Primary Examiner*—Leo H. Boudreau
*Assistant Examiner*—Bijan Tadayon

[57] ABSTRACT

The head in a series of video images is identified by digitizing sequential images, subtracting a previous image from an input image to determine moving objects, calculating boundary curvature extremes of regions in the subtracted image, comparing the extremes with a stored model of a human head to find regions shaped like a human head, and identifying the head with a surrounding shape.

49 Claims, 11 Drawing Sheets

METHOD AND MEANS FOR DETECTING PEOPLE IN IMAGE SEQUENCES

This is a continuation of Ser. No. 08/486,061, filed Jun. 7, 1995 now abandoned, which is a continuation of Ser. No. 08/094,286 filed Jul. 19, 1993, now abandoned.

BACKGROUND OF THE INVENTION

This invention relates to methods and means for detecting people in image sequences, and particularly for locating people in video images to facilitate visual communication.

Locating people in video images can facilitate automatic camera panning, interfacing of humans and machines, automatic security applications, human traffic monitoring, image compression and other applications.

U.S. Pat. No. 5,086,480 attempts to identify people in video images by subtracting corresponding image elements of subsequent images, thresholding the image elements against a luminous threshold to eliminate noise, filtering and clustering the resulting data sets, determining the minimum rectangle which will contain the sets, generating a border of finite thickness around the rectangles, and generating a head code book from the elements in the original images that correspond to the elements represented by the respective sets of data that fall within the respective borders. The patentee assumes that there is a moving head within any image which will provide the subtracted output. However, if a person in the image raises a hand, the disclosed method may confuse a hand and a head.

An object of the invention is to improve systems for identifying persons in a series of images.

Another object of the invention is to overcome the aforementioned difficulties.

SUMMARY OF THE INVENTION

According to a feature of the invention, these objects are attained, by obtaining the difference between one image and a previous image to extract regions of motion; comparing local curvature extremes at the boundary of motion regions with a stored model of a human head; and identifying the local boundary corresponding to the model of the human head.

According to another feature of the invention, the step of obtaining the difference between an image with a previous image includes digitizing the images before obtaining the difference.

According to another feature of the invention, the step of comparing the local boundary curvature extremes includes calculating the local extremes of curvature of the boundaries before comparing them with the stored model.

According to yet another feature of the invention, the step of comparing includes fitting a surrounding annular shape to the portion of the region boundary corresponding to a human head and neck.

These and other features of the invention are pointed out in the claims. Other objects and advantages of the invention will become evident from the following detailed description when read in light of the accompanying drawings.

BRIEF DESCRIPTION OF THE DRAWINGS

FIGS. 11A to 21A are examples of contours resulting from processing of the dilated images in FIGS. 11 to 21 according to the invention with annuluses drawn over the possible head portions of the contours, and showing confidence levels according to the invention.

DETAILED DESCRIPTION OF PREFERRED EMBODIMENTS

Figure 1:
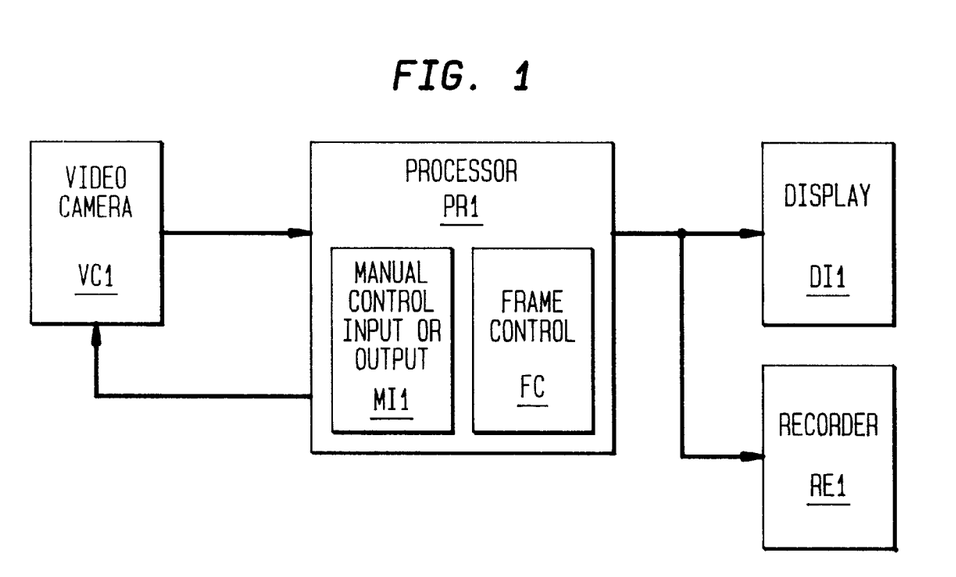
FIG. 1 is a block diagram of a system embodying features of the invention.

The block diagram of FIG. 1 illustrates one of a number of systems which embody the invention. Here, a video camera VC1 passes detected video signals to a processor PR1 in the form of a computer with suitable storage and a central processing unit. A display DI1 displays the video output from the video camera VC1 on the basis of the processing by the processor PR1. The video camera VC1 determines whether a scene includes at least one person. The processor PR1 generates control signals which a viewer can direct either to the video camera VC1, to the display DI1, or both. When the process of PR1 directs the control signals to the camera VC1, the control signals point the video camera onto the scene so as to place the person in the scene in a desired location, preferably the center. When directed to the display DI1, the control signals place the person electronically at a desired position in the scene, preferably the center. A recorder RE1, such as a video cassette recorder, may record the processed signal from the processor PR1.

The processor PR1 has a manual control or input MI1 which causes the display DI1 selectively to display the unprocessed output from the video camera VC1 or the processed video output, which centers or positions the person in the scene, from the processor PR1. A viewer camera VC1 can thereby choose alternately to display the unprocessed images from the video camera VC1 or the processed images, with a person centered or otherwise located from the processor PR1 where the processor PR1 controls the position of the video camera VC1. The selection of displays is entirely within the discretion of the viewer.

Figure 2:
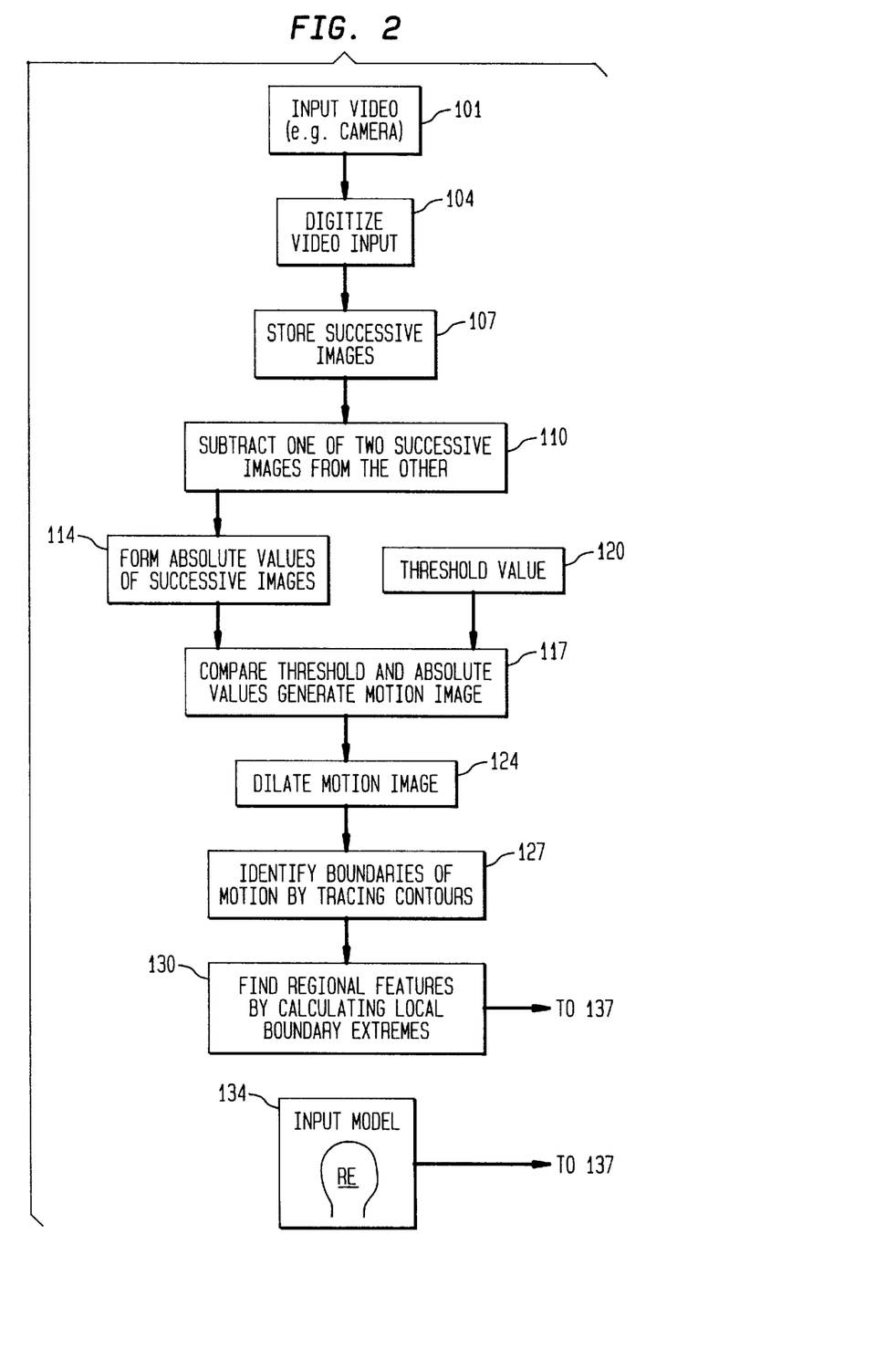
FIGS. 2 and 2A are flow charts illustrating the steps in a processor in FIG. 1 and embodying features of the invention.
Figure 2A:
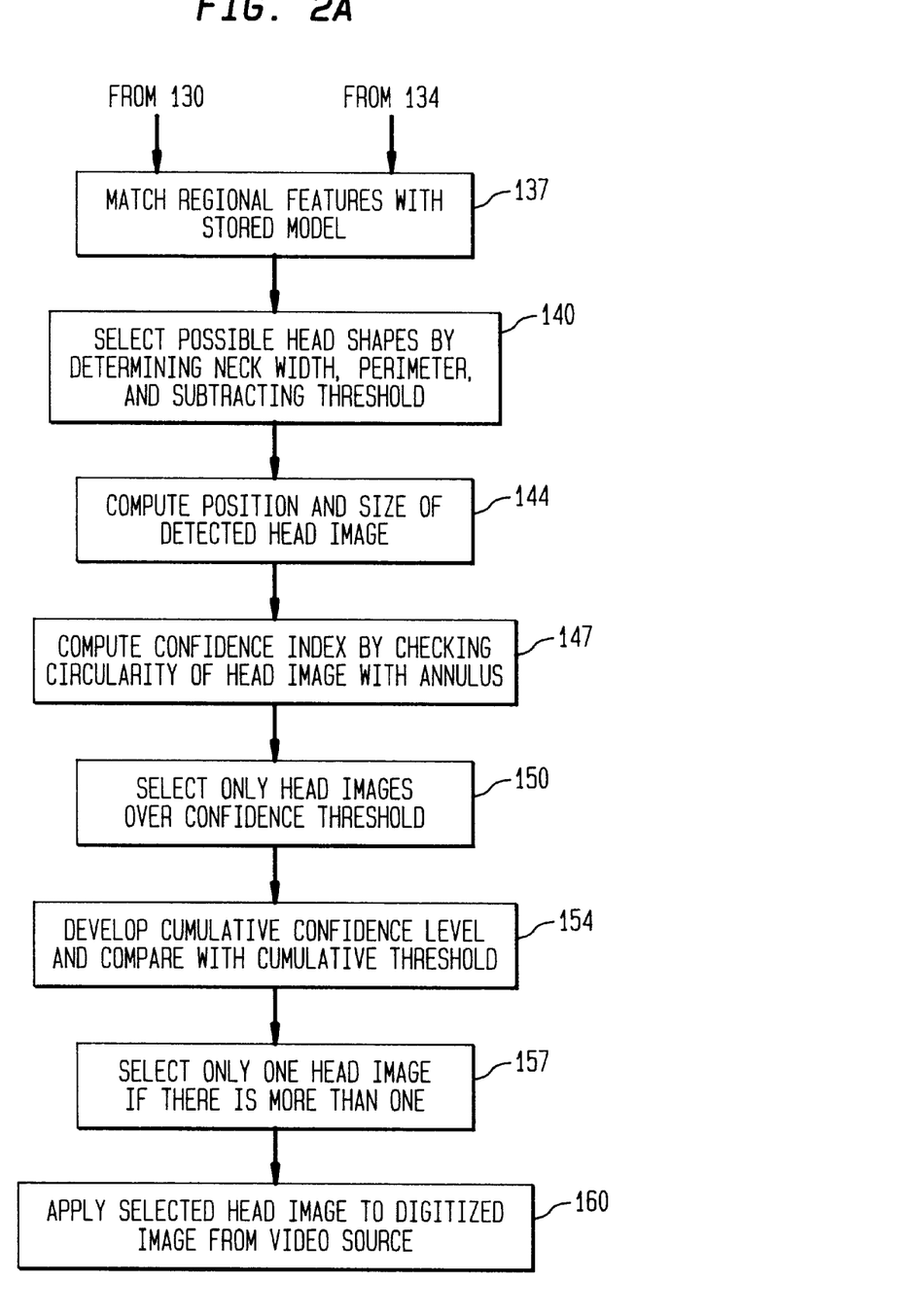

FIGS. 2 and 2A are flow diagrams illustrating steps performed by the processor PR1 to process the images from the video camera VC1. In the example of FIGS. 2 and 2A, the processor PR1, in step 101 receives the video input from the camera VC1.

If the video input is in the form of analog signals, the processor PR1, in step 104 digitizes the video input. In step 107, the processor PR1 stores successive images from the video input, and in step 110 subtracts one of two successive images from the other, that is it subtracts picture elements of one of two successive images from corresponding picture elements of the other. The processor PR1 preferably subtracts elements of immediately successive frames (or images), but may go backwards a number of frames for the subtraction process. In step 114 the processor PR1 forms absolute values of the elements in the subtracted images, and in step 117, compares it to a threshold value 120 stored in the processor PR1 and sets values greater than the threshold to 1 and values less than or equal to the threshold to zero to produce a binary motion image. The purpose of formation of absolute values, in step 114 and the comparison operation with a threshold value in step 117 is to remove temporal noise.

Thus, in steps 107 to 120, the processor PR1 produces "segmentation" by subtracting elements of a previous image from corresponding elements of an image currently coming from the video camera VC1, taking the absolute value, and thresholding the result to remove temporal noise in accordance with the equation $$d(x, y, t) = \begin{cases} 1 & \text{if } |f(x, y, t) - f(x, y, t - \tau)| > T \\ 0 & \text{otherwise} \end{cases} \quad (1)$$

The value τ represents the number of images or frames backwards which the processor PR1 selects for subtraction and preferably represents one frame or image. According to another embodiment of the invention, the processor PR1 includes a manually operable frame control FC to change the τ to higher integral values and allow a viewer to improve detection of slow moving objects. The frame control FC may be automatic.

According to one aspect of the invention, the value T which represents the threshold value is selected to remove all the noise. However, such a high threshold might remove a significant portion of the valid difference signal as well. According to a preferred embodiment, the processor PR1 uses a lower threshold value T which generates an image with some randomly spaced, isolated noise pixels, and postpones removal of the remaining noise until a later processing stage. According to one embodiment, a user controls input which sets the value of the threshold T to eliminate remaining noise which can affect the accuracy of the object/background segmentation.

Figure 3:
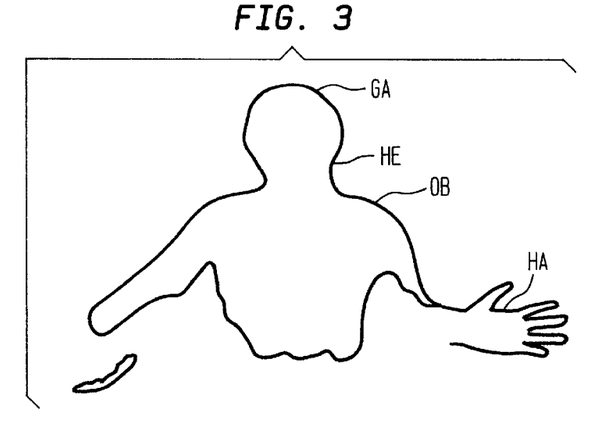
FIG. 3 is a picture of an image formed by subtracting the elements of one image from another according to an embodiment of the invention.

FIG. 3 illustrates the result of the subtraction occurring in steps 101 to 120. The subtraction often produces imperfect object segmentation in normal scenes where the processor PR1 may not recognize the head HE on the object OB in FIG. 3 as a head because of the gap GA near the center of the head. To improve segmentation, the processor PR1 in step 124 dilates the binary motion image to fill the gaps in the binary motion image as shown in the dilated object DO in FIG. 4. This filling does affect the resolution and accuracy. According to an embodiment of the invention, morphological closing, which is dilation followed by erosion fills the gaps. However, to save processing time, a preferred embodiment of the invention omits the erosion step and accepts the fact that the object size will increase slightly as a result of dilation.

Figure 4:
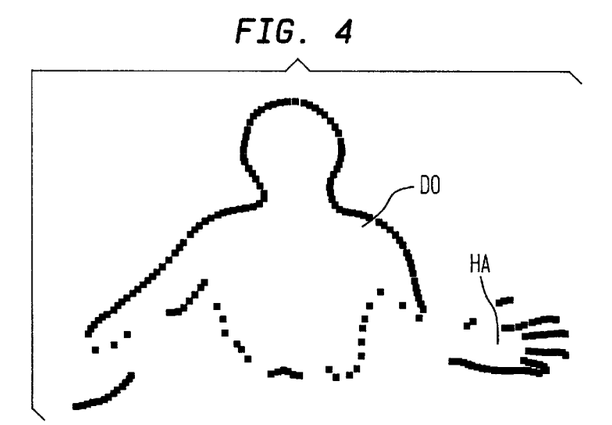
FIG. 4 is a picture of the dilated image of FIG. 3.

FIG. 4 illustrates the dilated figure and how it improves object segmentation. A hand HA appears in both FIG. 3 and FIG. 4.

In step 127 the processor PR identifies the boundaries of the difference image by tracing the contours of the outline of the dilated difference image shown in FIG. 4. The article by O. Johnson, J. Segen, and G. L. Cash, entitled *Coding of Two Level Pictures by Pattern Matching and Substitution*, published in the Bell System Technical Journal, Volume 62, No. 8, October 1983, discloses the contour tracing of step 127 and finding regional features by calculating local boundary curvature extremes of step 130 in FIG. 2. In using the process of the aforementioned Segen article, the processor PR1 finds the coordinate values of the region boundaries (x(i) and y(i)). In step 130, the processor PR1 independently smoothes the coordinate values of the region boundaries with a rectangular filter of length 2k+1 where k is a parameter for computing the k-curvature of the contour. Determination of the k-curvature of a contour is known and appears in the article by A. Rosenfeld, and A. Kak, *Digital Picture Processing*, Academic Press, 1976, ISBN 0-12-597360-8. It also appears in the 1933 SPIE article from the SPIE Conference on Robot Vision and Sensory Control, in Cambridge, Mass., entitled *Locating Randomly Oriented Objects from Partial View*, by Jakub Segen. The components of the step 130 appear in FIG. 5 as steps 501 to 524. They start with the smoothing step 501, the slope determining step 504, and the computing step 507.

According to another embodiment of the invention, the curvature is determined otherwise. However, k-curvature is simple and sufficient for the purposes of this invention.

Figure 5:
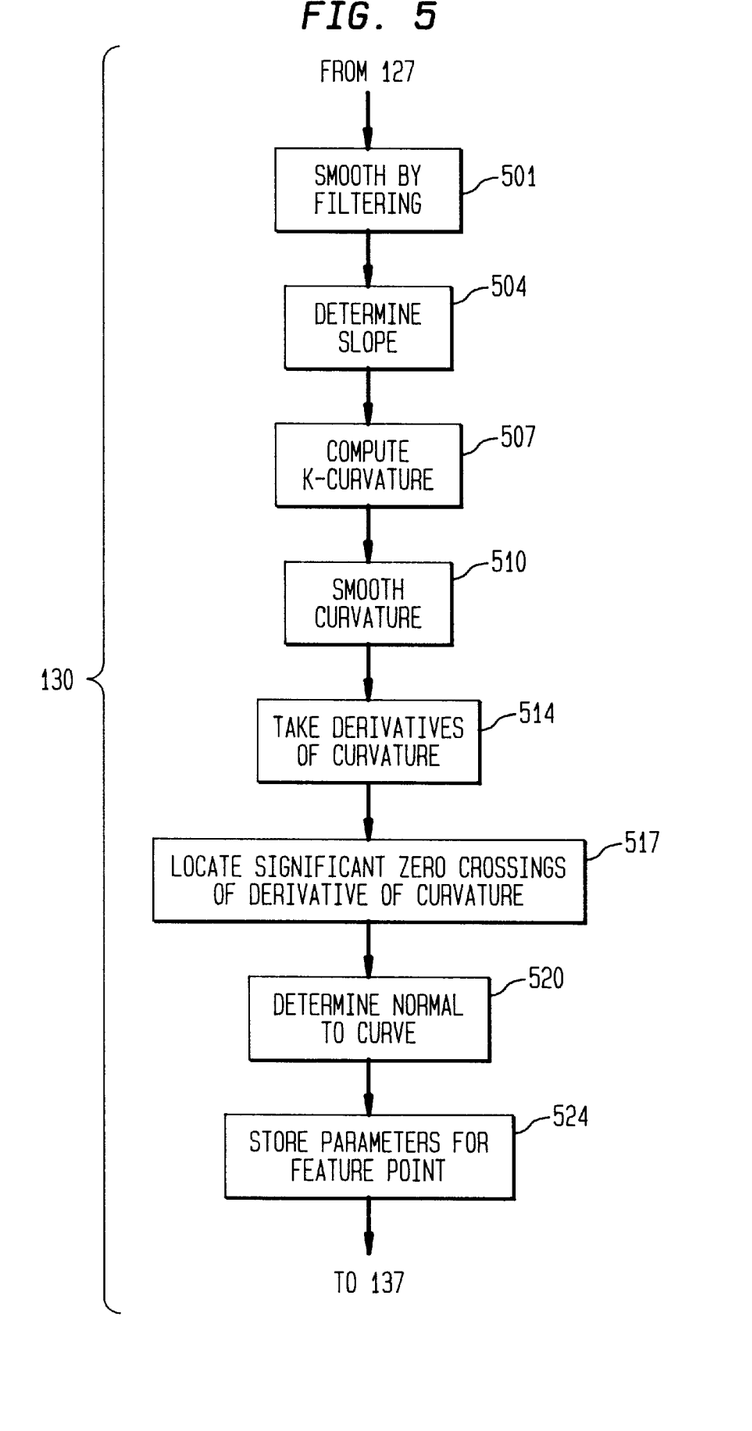
FIG. 5 is a block diagram showing details of a step in FIG. 2.

In FIG. 5, step 507 calculates the orientation O(i) or k-slope as follows:

$$d_x = x'(i-k) - x'(i-k) \quad (2)$$

$$d_y = y'(i+k) - y'(i-k) \quad (3)$$

$$O(i) = \text{A tan } 2(d_y, d_x) \quad (4)$$

Where the primes denote the smoothed version of the contour, and the Atan2 function computes the arc tangent of $d_y/d_x$ to the range of $-\pi$ to $\pi$ as in rectangular to polar coordinate conversion. The curvature is computed as $$C(i) = O\left(i + \frac{k}{2}\right) - O\left(i + \frac{k}{2}\right) \quad (5)$$

In step 510, the processor PR1 smoothes the curvature of the image; determines the derivatives of the curvature in step 514; locates the significant zero crossings of the derivative of the curvature in step 517; and determines the normal to the curve at each significant zero crossing in step 520 using two points on the contour, each separated by the Euclidean distance k from the point of the significant zero crossing. In step 524, it stores parameters for each of these "feature" points (i.e. zero crossings of the derivative), namely the x-y location, curvature, and the angle of the normal to the curve. The curvature is positive for convex features and negative for concave features. The processor PR1 stores the feature points in the order that they appear in the contour which the processor traces clockwise.

Figure 6:
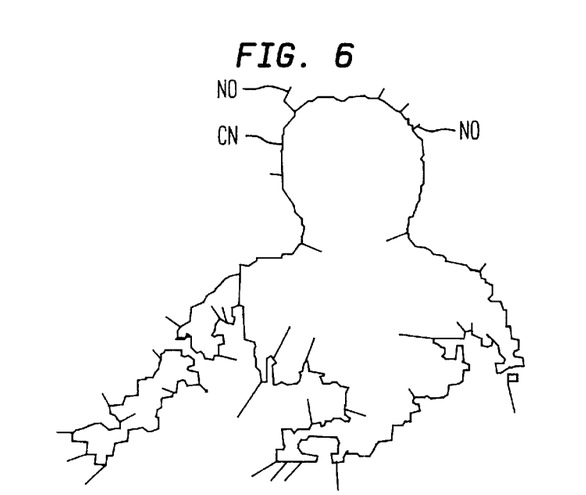
FIG. 6 is a contour image of the image in FIG. 4.
Figures 7, 8, 9:
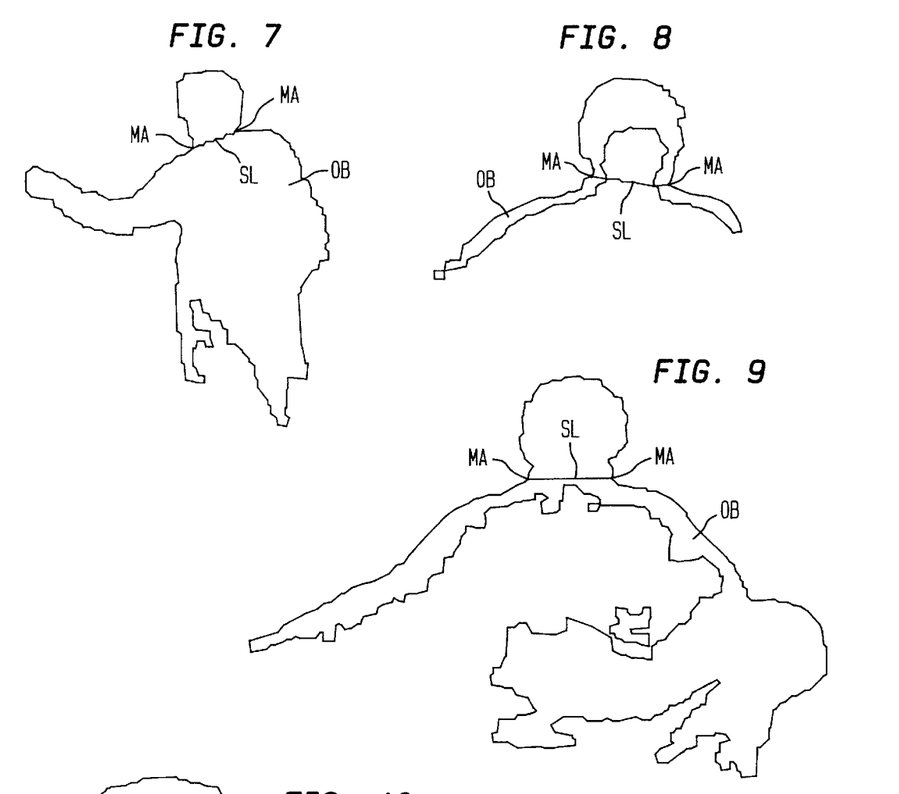
FIGS. 7 to 10 are examples of images of correct detections from contours obtained from dilated frame-to-frame difference images with straight lines dray to indicate locations of local maxima of curvature at the necks.
Figure 10:
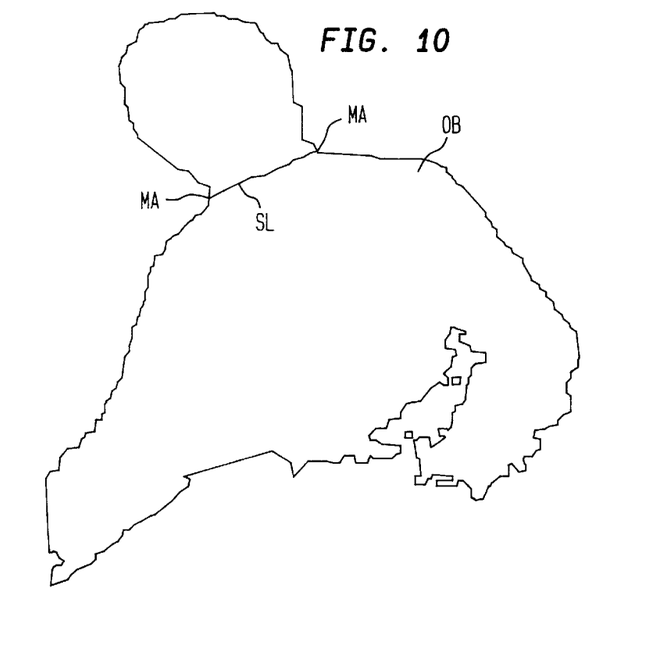
Figure 11:
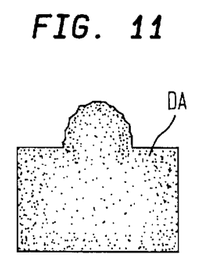
FIGS. 11 to 21 are examples of dilated images of potential head and chests of persons to be found according to the invention.
Figure 11A:
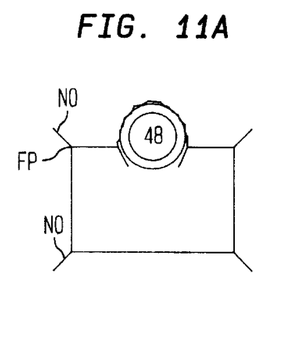
Figure 12:
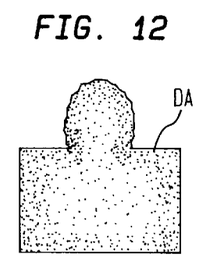
Figure 12A:
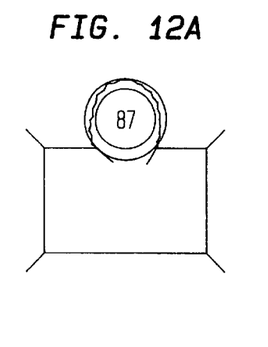
Figure 13:
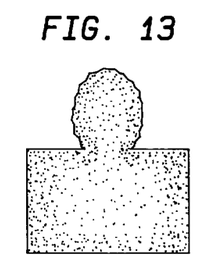
Figure 13A:
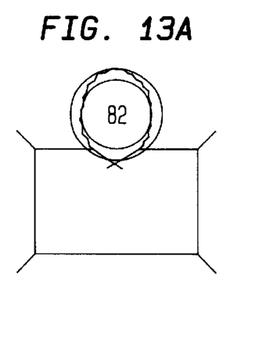
Figure 14:
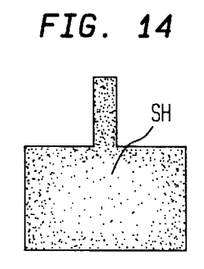
Figure 14A:
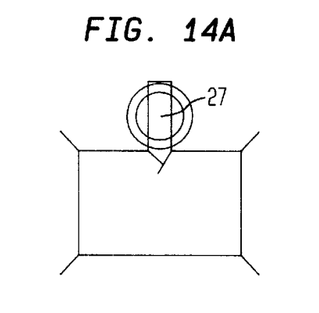
Figure 15:
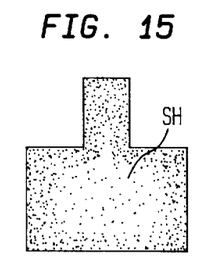
Figure 15A:
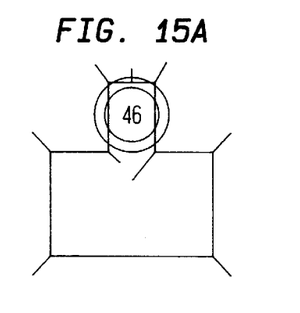
Figure 16:
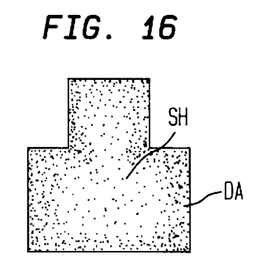
Figure 16A:
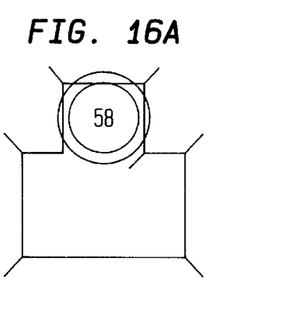
Figure 17:
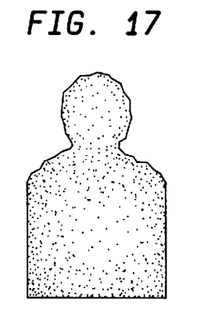
Figure 17A:
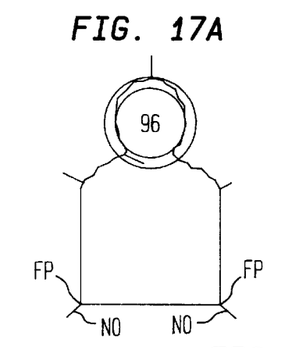
Figure 18:
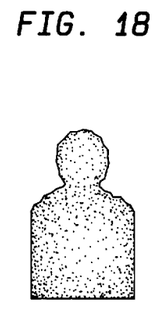
Figure 18A:
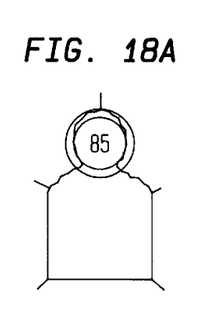
Figure 19:
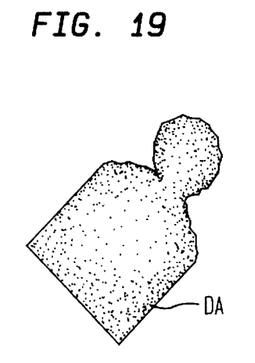
Figure 19A:
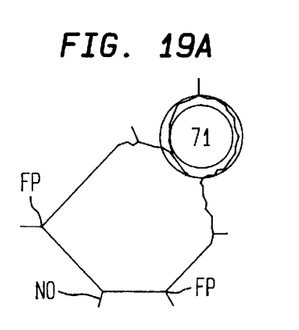
Figure 20:
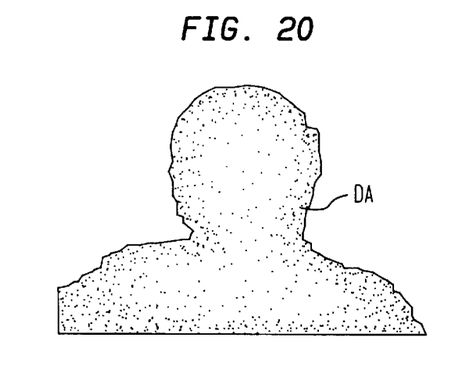
Figure 20A:
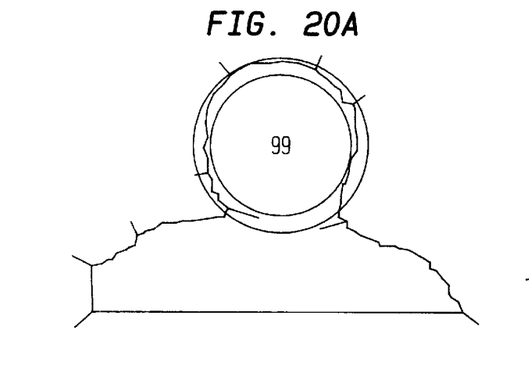
Figure 21:
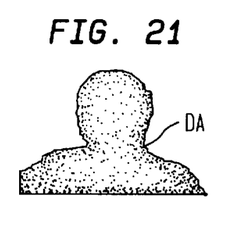
Figure 21A:
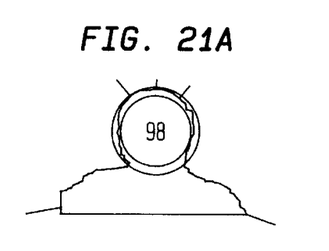

FIG. 6 illustrates the results of contour tracing in step 127 and the calculation of local boundary curvature extremes set forth in step 130 and in steps 501 to 524. FIG. 6 includes the normals NO as well the traced contours CN.

At this point in the processing, the processor PR1 has reduced the data from regions to contours to feature points. The processor PR1 now proceeds to locate features corresponding to head and neck shapes from the set of feature points. For this purpose, the processor PR1 uses a simple, hard coded (not learned) model of the shape of the head and neck in the model input step 134. A representative RE of the model appears with step 134.

In step 137 the processor PR1 matches regional features with the stored model. In this step, the processor PR1 looks for a sequence of feature points that indicate concavity at the left side of the neck, convexity at the top of the head, followed concavity at the right side of the neck. It examines only the sign of the curvature not the magnitude. Because the top of the head is roughly circular, the position of the local maximum of curvature is highly sensitive to noise or background segmentation errors. In fact there may be more than one feature point present. Therefore, the processor PR1 searches for one or more convex feature points at the top of the head without restriction on their location. It limits the acceptable direction of the normal to the contour at the neck points to ensure that the detected head is roughly pointing up. It accepts only the normal to the object at the left neck point in the range of 90 to 225 degrees, and the right neck point from −45 to 90 degrees. This restricts overall head tilt to about ±30 degrees from the vertical. FIGS. 7, 8, 9, and 10 show objects OB in images which represent examples of correct detection from contours obtained from dilated, binary motion images. Straight lines SL connect locations of the local maxima of curvatures MA at the neck. The matching step 137 does not require the presence of feature points corresponding to the shoulders.

In step 140 the processor PR1 identifies a possible head shape, it calculates the neck width from the positions of the neck feature points. It compares the neck width to a gross size and determines that the left neck point is indeed to the left of the right neck point. It also measures the perimeter of the possible head and neck and selects only those possibilities whose perimeters exceed a given perimeter threshold. This minimum perimeter restriction results in skipping remaining isolated noise region. The processor repeats steps 137 and 140 for each region which is a possible head.

FIGS. 11 to 21 show other difference images DA and FIGS. 11A to 21A show corresponding contours with feature points and normals NO at feature points FP. Each figure number followed by the letter A represents the contour of the figure with the corresponding Figure number. The process up to step 144 detects the head and neck shapes but will also detect other shapes such as inverted T-shapes SH, for example those in FIGS. 14 to 16 and FIGS. 14A to 16A.

Figure 22:
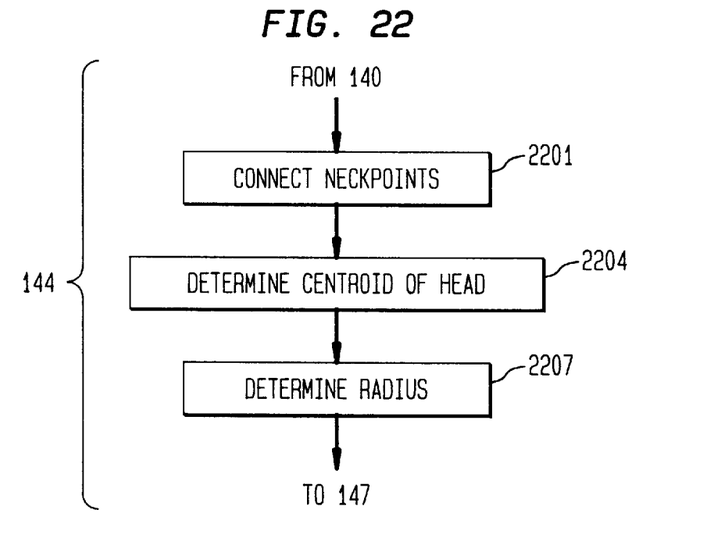
FIG. 22 is a flow chart showing details of a step in the chart of FIG. 2.

Prior to step 144, the processor PR1 used only the feature points to match shapes. In step 144, the processor goes back to the contour itself. In step 144, the processor finds a possible head's center by computing the centroid of the segment of the contour that traverses the possible head and is terminated by possible neck points. A straight line connecting the neck points enters the centroid calculation. The radius of the head then becomes the mean distance from the calculated center of the head to the contour. Details of step 144 appear in the sub-steps 2201 to 2207 in FIG. 22. Here, in step 2201 the processor PR1 connects the neck points, computes the centroid of the feasible head in step 2204, and determines the likely head radius in step 2207.

Step 147 checks the circularity of a possible head by assigning a confidence level to each detection. The circularity check looks for circular shapes on top of neck-like structures. According to another embodiment of the invention, other feature points are used as a confidence metric.

As shown in FIGS. 11A to 21A, the processor PR1 detects the confidence level (step 147) by determining the percentage of contour points that lie approximately within an annulus whose radius extends from the potential head radius minus one-sixth of the radius to the possible head radius plus one-sixth of the possible head radius. One can consider this as placing an annulus with a thickness equal to one-third of the head radius on the possible head and seeing how much of the contour the annulus covers. Heads are actually more elliptical than circular, but the thickness of the annulus is sufficient to compensate for the head's eccentricity.

In step 150 of FIG. 2A, the processor PR1 selects head images only if they are over a confidence image threshold percentage. This threshold is a selected default value which a user can override. A typical default value is 40% According to an embodiment of the invention, suitable means allow the user to change the threshold.

In step 154, the processor PR1 develops an cumulative confidence level and selects possible head shapes only if they exceed a cumulative confidence threshold. According to an embodiment of the invention, suitable means allow the user to change the cumulative threshold. In step 157, the processor PR1 determines whether more than one head image is over the cumulative confidence threshold. If so, it selects one head image by default. For example, the default head image may be the center one. According to an embodiment of the invention, the user operates an input to change the default rule, for example to select the fastest moving head.

At this point, the processor PR1 has identified a person by the head image and uses that information to apply the selected head image to the video image so as to extract that image and focus the video camera onto the image with the control as shown in step 160.

Figure 23:
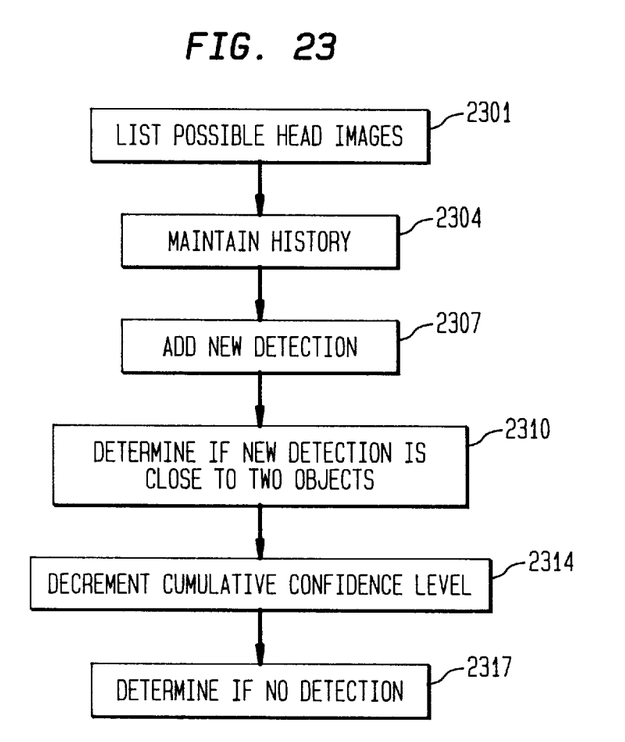
FIG. 23 is a flow chart illustrating other steps embodying features of the invention.

The flow chart of FIG. 23 illustrates details of step 154. Here, in step 2301, the processor PR1 maintains a list of possible head shapes exceeding a predetermined threshold confidence level. In step 2304 it maintains a history of detections of each possible head with position, size, confidence level, time stamp, and forms a cumulative confidence level composed of previous levels. That is, it combines a new confidence level with an earlier level to start forming the cumulative confidence level and then combines newly detected confidence levels with the accumulated confidence level. A recursive low pass filter in the processor PR1 smoothes the calculated size (filtered size). As new possible head images enter the camera's field of view, the processor PR1 adds them to a list of possible heads and places them in position for selection as a default.

In step 2307, if the location of a new detection is close to one of the previous possible heads, the processor PR1 adds the new detection to that of the earlier possible head. The processor PR1 then adds the each new detection's confidence level to the cumulative confidence level, and its size modifies the filtered size. In the processor PR1, the recursive low-pass filter calculates the filtered size by taking 80% of the old filtered size and adding 20% of the newly detected size. Other types of low-pass filters can be used and the percentages may vary. In step 2310, the processor determines if the new detections is close to two objects and attributes it to the one that last had a detection. This makes it possible correctly to track a person who passes a stationery person. The moving person represents the more recently detected one than the stationery one.

In step 2314, the processor PR decrements the cumulative confidence level each time a head fails to appear in a frame. The processor PR does not consider an object as a valid head till the cumulative confidence exceeds a threshold. This assures confident detection several times.

In step 2317, the processor PR determines that no person, i.e. no head appears in a frame. If it detects little motion, as indicated by small difference-image regions, the processor does not update the background image. This conditional background subtraction corresponds to increasing the $\tau$ parameter in equation (1). This effectively decreases the temporal sampling rate and effectively increases the speed of the objects.

According to another embodiment of the invention, the processor PR utilizes static background subtraction by repeatedly subtracting a background frame acquired at some time $t=t_0$ from the sequence. In equation (1), $f(x,y,t-\tau)$ would become $f(x,y,t_0)$. Such static background subtraction offers the advantage that the difference signal is the same regardless of whether the person is moving or at rest. This contrasts with the frame subtraction, i.e. dynamic background subtraction, which the signal goes to 0 if the person stops moving. The object velocity does not affect the detection rate with static background subtraction.

According to another embodiment of the invention, the processor PR subtracts off a temporally low pass filtered version of the sequence instead of subtracting or comparing previous frames. That is, it compares the input image to the low-pass version.

According to an embodiment of the invention, the processor PR1 utilizes image processing hardware such as a Datacube MaxVideo20 image processing system, a general purpose computer such as a SKYbolt i860 single board computer, and a Sun Sparc engine 1e. The Sun Sparc engine acts mainly as a system controller. The processor PR1 hardware includes the processing units and other peripherals to form the means for performing the steps in each of the figures, other than those performed outside the processor. The particular hardware disclosed is only an example, and those skilled in the art will recognize that other processing equipment can be used.

The camera CA uses a 4.8 mm c-mount lens, a ⅔ inch CCD in a Sony XC-77 camera. The processor PR1 digitizes the image to 512 by 480 pixels which have a 4.3 aspect ratio. This yields an active detection area from 1 foot to 10 feet from the camera with an 80 degree horizontal and 60 degree vertical field of view. According to an embodiment of the invention, timing of the digitizer is changed to produce square pixels. It is possible to get a full 80 degrees with square pixels by digitizing a 682 by 480 pixel image.

According to one embodiment of the invention, the setting of T in equation (1) is 13. According to another embodiment of the invention T=8 in order to lose less of the signal. In the processor PR1, background removal and dilation take place on the MaxVideo20 image processing system. This is a pipeline system in which low-level, full frame operations take place in real time. The MaxVideo20 image processing system's 256 by 256 lookup table and double buffers serve for background removal. The SKYbolt computer performs the remaining processing.

According to an embodiment of the invention the processor PR1 uses a convolver to dilate. Specifically it uses the MaxVideo20 image processing system's 8×8 convolver to perform the dilation operation. Dilation with this large kernel provides increased region growing performance. Convolution of the image $f(x,y)$ with an 8×8 kernel $h(i,j)$ is $$g(x, y) = \sum_{i=1}^{8} \sum_{j=1}^{8} f(x+i, y+j) h(i, j) \qquad (6)$$

If a binary image $f(x,y)$ with values zero and one, is convolved with an 8×8 kernel of all ones ($h(i,j)=1$), the resulting image $g(x,y)$ will have values from zero to 64. This is normally thought of as a low pass filtered image, but in this case the grey scale values can be interpreted differently. These values indicate the number of non-zero pixels in the 8×8 neighborhood surrounding each pixel.

Dilation involves the concept of passing a structuring element (kernel) over an image and setting a one in each pixel at which there is a non-empty set intersection between the image and the structuring element. Intersection is defined as the logical "and" operation for each member of the structuring element and the corresponding image date. Setting all values greater than zero to one in the convolved image $g(x,y)$, produces the same result as dilating the original image with a 8×8 structuring element. If $$g'(x, y) = \begin{cases} 1 & \text{if } \sum_{i=1}^{8} \sum_{j=1}^{8} f(x+i, y+j) > 0 \\ 0 & \text{otherwise} \end{cases} \qquad (7)$$

then g' is the dilation of f with structuring element H (with $h(i,j)=1$)

$$g'(x, y) = \{x, y: h_{x,y} \cap f \neq 0\} \qquad (8)$$

where $h_{x,y}$ is h translated to the point (x,y). This is disclosed in the publication by A. K. Jain, *Fundamentals of Digital Image Processing*, Prentice-Hall, Inc., 1989, ISBN 0-13-336165-9.

According to an embodiment of the invention, rather than using all the non-zero values in the resulting image, the processor PR1 thresholds it to remove isolated noise pixels. According to another embodiment of the invention, in a first step, the processor PR1 places the condition that there must be at least n, for example n=2, pixels in an 8×8 region for the center pixel to be considered part of an object. The next noise removal step occurs during extraction of the contour, where the boundary tracing routine rejects small (noise) regions.

According to an embodiment of the invention, in contrast to the full frame processing described above, the processing takes place on a general purpose microprocessor (an Intel i860 in a SKYbolt single board computer) running "C" code. The input to this section is the output of the full frame processing section: A two dimensional, eight bit array which is the dilated frame difference image.

The contour extraction generates a list of X-Y coordinate pairs that correspond to the boundaries or closed contours of regions in the difference image. An embodiment of the invention, in order to speed processing, employs some short cuts on the standard contour following algorithm disclosed in the aforementioned Jain article. First, the image is sparsely sub-sampled vertically while searching for objects (only every 20th line is examined.) This causes skipping of some small objects so it essentially imposes a minimum height requirement for the objects. Second, tracing of the contour involves subsampling the image data two to one in both directions. Only even numbered pixels on even numbered rows are examined. Third, no attempt is made to find internal contours (e.g. the center of a doughnut shape would not be found.)

Another embodiment finds multiple objects, i.e. possible heads, while avoiding tracing the same object twice, as follows. Prior to the searching the image for blobs, the entire search pattern (every other pixel on every 20th line of the dilated difference image) is thresholded. If the pixel is non-zero, it is set to one. It is not necessary to threshold the whole image, only the places being searched. The system begins to scan the image to find blobs (as indicated by non-zero values.) When a blob is found, its boundary is traced and stored to be used later. Then it tags the blob as having been traced by writing a tag level (for example use the value 2) into the image along the blob boundary. Processing actually modifies the image data as processing occurs. This leaves three possible types of pixel values in the search path: zero, which indicates no object; one, which indicates a new object to be traced; and two, which indicates an object that has already been traced. As the scan proceeds, the following algorithm is used:

If the pixel value is zero, skip to the next even numbered pixel (i.e. continue searching,)

if the pixel value is one, trace the contour of the object and tag the blob, if the pixel value is two, keep following the line until another two is found (which indicates the right hand edge of the blob.)

Figure 24:
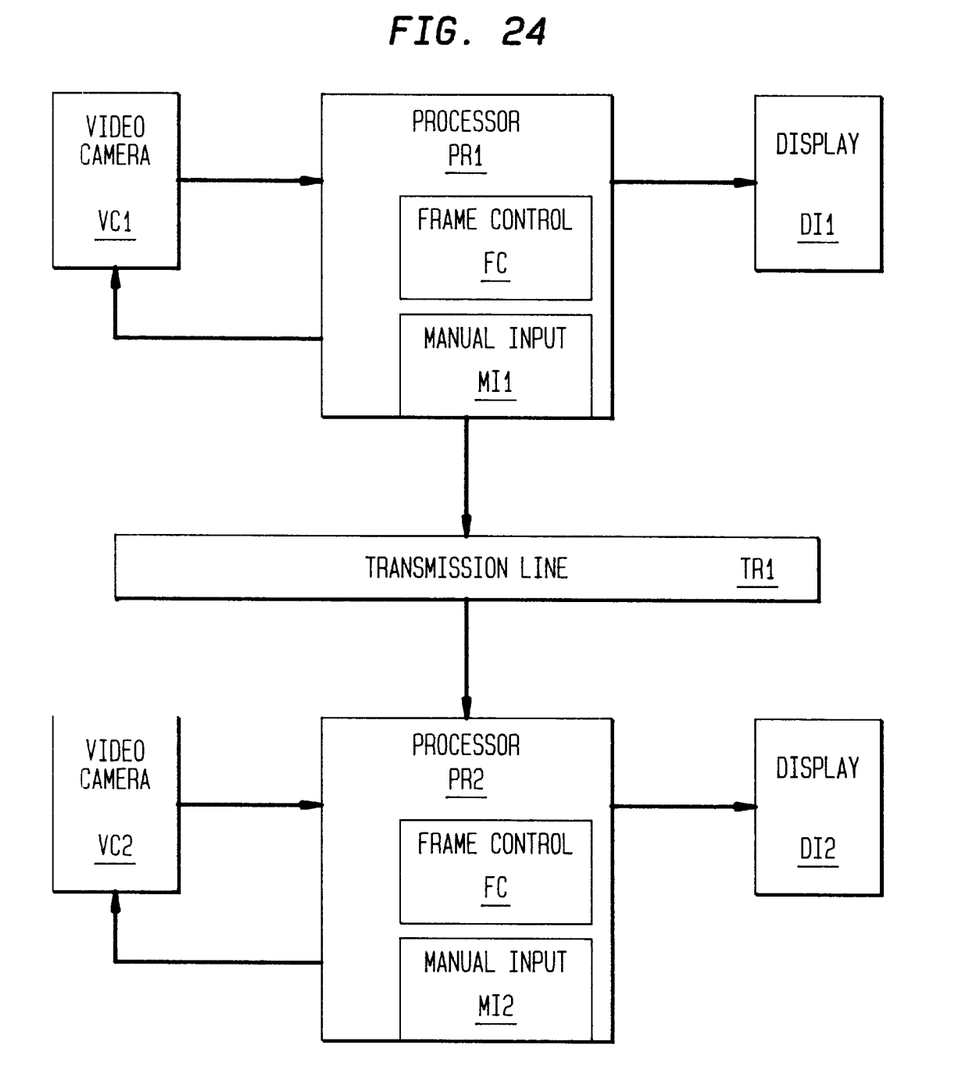
FIG. 24 is a block diagram of another system embodying the invention.

The block diagram of FIG. 24 illustrates a teleconferencing and televideo system embodying the invention. Here, the video camera VC1 is at one televideo station TS1 and passes detected video and audio signals to the processors PR1. The display DI1 displays the video output and plays the audio output from the video camera VC1 on the basis of the processing by the processor PR1. The video camera VC1 records a scene which includes at least one person, the processor PR1 also emits control signals to the video camera VC1, to center the video camera on the person or to cause the display to center the person electronically.

A transmission line TR1 transmits the video signal that the processor PR1 develops for the display DI1, as well as the audio signal to a processor PR2, corresponding to the processor PR1, at a second televideo station TS2. The processor PR2 also produces control signals which can, upon command, control a video camera VC2 and cause it to center on a person. The processor PR2 also processes signals from the video camera VC2 and displays those signals in a display DI2 and upon command, can center a person in the display.

The processors PR1 and PR2 have respective manual inputs MI1 and MI2 which cause displays DI1 and DI2 each selectively to display the processed input from the video cameras VC1 or VC2 or both. A viewer at either the end of the video camera VC1 can thereby choose to display the processed images from the video camera VC1 or the processed images from the video camera VC2, or both. Similarly, the viewer at the end of the video camera VC2 can choose to display, on the display DI2, either the processed video images from the video camera VC2, or the processed video images at the video camera VC1, or both. The selection of displays is entirely within the discretion of the viewers, and hence the transmitters, at either end of the transmission line TR1. Typically, a viewer of the display DI1 would wish to see the processed images from the camera VC2 and the viewer at the displayed DI2 would wish to see mostly the processed images from the video camera VC1. Each viewer would be expected to switch the viewing scene only temporarily from time to time to the local scene rather than the remote scene.

The processors PR1 and PR2 also permit each viewer to select the unprocessed views from each of the cameras VC1 and VC2.

The system of FIG. 24 allows automatic panning. It permits participants at one site to control a camera at a distant site and permits panning and zooming to get a better image of the portion of the scene that is of interest to the viewer.

Figure 25:
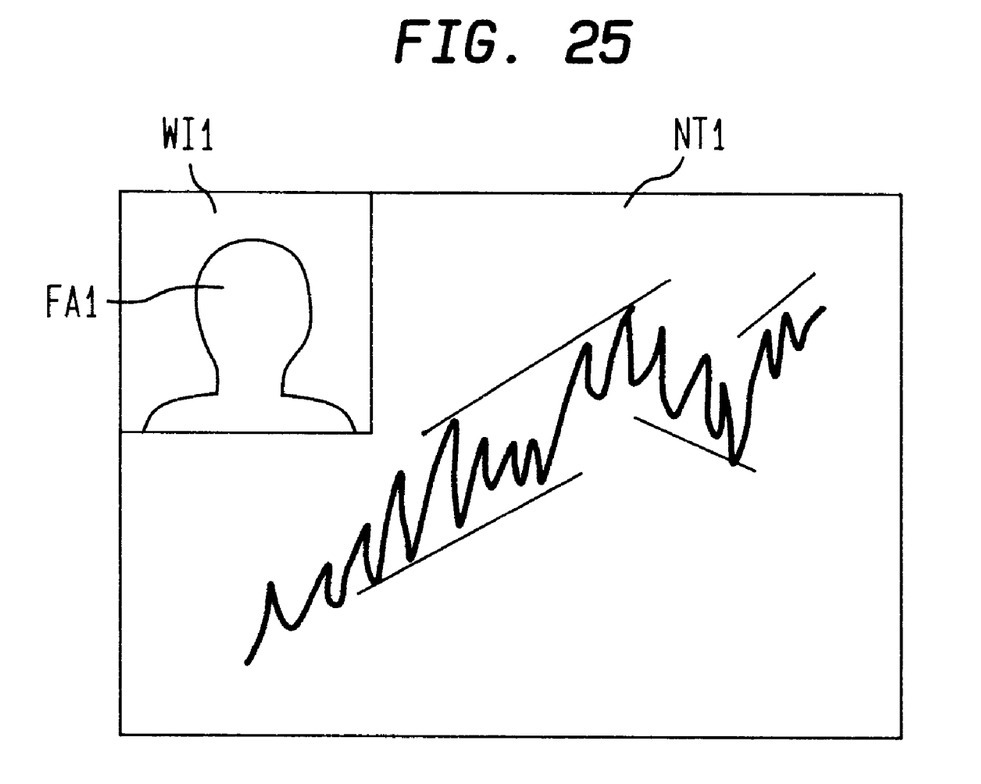
FIG. 25 is a view of a video display showing operation of a system according to one aspect of the invention.

FIG. 25 shows a picture-in picture for tele-education and tele-lecturing. The instructor's face FA1 appears in a window WI1 that is superimposed on an image of notes NT1 being presented. In the systems of FIGS. 1 and 25, the processors PR1 and PR2 include means for selecting the instructor's picture and superimposing it in the position shown.

The invention helps the acceptance of video telephony because the user need not remain positioned directly in front of the terminal to be in the camera's field of view. In video telephony and teleconferencing, the automatic camera panning frees the user to concentrate more on personal interaction and less on such technical issues as camera viewing angles. It eliminates the need for a camera operator in tele-education. It reduces the cost and the complexity of tele-education.

According to an embodiment of the invention, the orientation of a person's head acts as a source of computer input to control a cursor. Alternatively, the person detection serves as a pre-processing step for gaze tracking. In turn, gaze tracking serves as a human-machine interface.

According to yet another embodiment of the invention, a system of FIGS. 1 and 25 operate as a video motion detection system in television surveillance. The system automatically switches the input to the operator's monitors which view only scenes with motion in them. The system discriminates between people in the images and other moving objects. It raises an alarm (not shown) upon detection of a person.

The system of FIG. 1, in an embodiment of the invention, has the processor PR1 store images on the VCR so that it responds only to images with people. This reduces data storage requirements by extracting sub-images containing persons.

The apparatuses of FIGS. 1 and 25, in another embodiment of the invention, record traffic patterns of patrons in retail stores. This permits evaluation of the effectiveness of a new display of or arrangement of merchandise by examining the change in traffic. An eye catching arrangement would result in increased dwell time of passersby.

The invention improves the potential for image compression by incorporating knowledge of locations of persons on the image. For example, a first step involves feeding a sub-window at full camera resolution to the image and coder instead of subsampling an entire image. The invention permits person detection to select the subwindow of interest. This essentially uses electronic camera panning as a compression aid.

The invention makes it possible to detect a person almost anywhere in a scene with a single camera. It can operate in normal office environments without requiring special lighting or imposing background scene restrictions. It permits real time operation. It avoids special startup procedures such as acquiring a background image with no persons present. It furnishes robustness in the face of camera position changes or scene changes such as lighting changes.

The invention may be used as a pre-processing step in the type of face recognition described by N. Farahati, A. Green, N. Piercy, and L. Robinson in *Real-Time Recognition Using Novel Infrared Illumination*, in Optical Engineering, August 1992, Vol. 31, No. 8, pp 1658–1662.

According to another embodiment of the invention, the video cameras VC1 and VC2 record not only video but audio signals needed for teleconferencing and other purposes. The displays DI1 and DI2 as well as the recorder RE1 include audio equipment for audio output and recording as needed.

In the processors PR1 and PR2, according to the invention, each step performed bad the computer components, such as determining, producing a signal, etc. generates a physical signal in the form of a voltage or current. The processors PR1 and PR2 hardware includes the processing units and other peripherals to use these signals and form the means for performing the processor steps in each of the figures.

In an embodiment of the invention, either or both of the cameras CA1 and CA2 utilizes a wide-angle lens in the process of identifying the region of a head. After reaching a satisfactory cumulative confidence level, either or both the processors PR1 and PR2 zooms in on the head by electronic panning, tilting, and zooming in a known manner. The reproduction of the zoomed head now increases and takes up a much larger portion, and, if desired, virtually all of the screen in the appropriate display DI1 or DI2. The image follows the now-enlarged head as the person moves from side to side, sits down, rises, or walks away.

In still another embodiment of the invention the same signals that control the pan and tilt of the video signal serve to focus the sound pattern of a microphone on the camera on the head of the person.

While embodiments of the invention have been described in detail it will be evident to those skilled in the art that the invention may be embodied otherwise without departing from its spirit and scope.

What is claimed is:

1. A method of locating a person in a video picture, comprising the steps of:
    forming a differential image from time displaced video images to extract differential figures from the video images;
    comparing local boundary curvature extremes of outlines of the differential figures with outlines of a stored model of at least a part of a human body which includes a head and a portion of the body immediately below the head; and
    in response to the comparing step identifying a region in the video picture from the step of comparing the local boundary curvature extremes of outlines of the differential figures with outlines of the stored model of the head and the portion of the body immediately below the head;
    the portion of the body immediately below the head being a neck.

2. A method as in claim 1, wherein the step of forming the differential image includes digitizing the video images and subtracting one image from another time displaced image.

3. A method as in claim 1, wherein the forming step includes digitizing the video images to form two dimensional arrays of digital image data and subtracting one image from another time displaced image.

4. A method as in claim 3, wherein the forming step includes forming a threshold and taking absolute values of the digital image data and comparing the absolute values with a threshold.

5. A method as in claim 1, wherein the step of comparing the local boundary curvature extremes includes calculating outlines of the local boundary curvature extremes before comparing the outlines of the curvature extremes with outlines of the stored model.

6. An apparatus for locating a person in a video picture, comprising:
    a video device containing video images of a scene;
    a processor responsive to said video device for forming a differential image from a time displaced video images to extract differential figures; comparing local boundary curvature extremes of outlines of the differential figures with outlines of a stored model of at least a part of a human body which includes a head and a portion of the body immediately below said head; and identifying a region in the video picture in response to the comparing of the local boundary curvature extremes of outlines of the differential figures with outlines of the stored model of the head and the portion of the body immediately below the head;
    the portion of the body immediately below the head being a neck.

7. A method as in claim 1, wherein the step of identifying includes the step of fitting a surrounding band to the portion of the region of the outlines of the differential figures corresponding to outlines of the head.

8. A method as in claim 7, wherein the surrounding band is an annulus.

9. A method as in claim 1, further comprising the step of responding to the identifying step and sensing data from a subregion of one of the video images corresponding to the outlines of a pattern of a head for display of at least a portion of the subregion.

10. A method as in claim 9, wherein the display of at least a portion of the subregion includes display of outlines of a pattern of a head.

11. A method as in claim 9, further comprising the step of responding to the step of selecting includes the step of transmitting data of outlines of the head within said subregion.

12. A method as in claim 1, further comprising responding to the identifying step and then performing the step of sensing data from a subregion of one of the video images corresponding to a pattern of a head to transmit outlines of a pattern of a head and achieve the effect of a camera being manually pointed at the head.

13. A method as in claim 12, wherein the sensing of the region includes controlling a mechanical system for pointing a camera to keep the pattern of the head within one of the video images.

14. A method as in claim 9, wherein the step of sensing includes allocating a greater portion of transmission bandwidth to same subregion.

15. A method as in claim 9, wherein the step of sensing includes the step of selecting one of several cameras in a system on a basis of the sensing so as to display the camera with the subregion with the pattern of said head in its field of view.

16. A method as in claim 9, wherein the step of sensing a subregion includes the step of forming a computer input to permit rendering a three dimensional representation.

17. A method as in claim 9, wherein the step of sensing includes the step of limiting an area of the sensing to the subregion to permit increase of speed and efficiency of recognizing a face on said head.

18. A method as in claim 9, wherein the step of sensing includes storing statistical data about motion and presence of heads in a scene.

19. A method as in claim 1, wherein the step of identifying includes centering the head in a video image.

20. A method as in claim 1, wherein the step of identifying includes the step of placing a pattern of a head at a predetermined position in at least one of the video images.

21. A method as in claim 1, wherein the step of forming a differential image from video images includes the step of subtracting immediately successive images.

22. A method as in claim 1, wherein the step of forming includes the step of subtracting images separated from each other by a time $\tau$ and varying the time $\tau$ to adjust the figures.

23. A as in claim 22, wherein the step of varying the time τ is done manually.

24. An apparatus for locating a person in a video picture, comprising:
   a video device containing video images of a scene;
   a processor responsive to said video device for forming a differential image from a time displaced video images to extract differential figures; comparing local boundary curvature extremes of outlines of the differential figures with outlines of a stored model of at least a part of a human body which includes a head and a portion of the body immediately below said head; and identifying a region in the video picture in response to the comparing of the local boundary curvature extremes of outlines of the differential figures with outlines of the stored model of the head and the portion of the body immediately below the head;
   wherein said processor fits a surrounding shape to the portion of the region boundary corresponding to the head in the video images and the surrounding shape is an annulus.

25. An apparatus as in claim 24, wherein the processor digitizes the video images and subtracts a video image from a time displaced video image.

26. An apparatus as in claim 24, wherein the processor digitizes the images to form two dimensional arrays of digital data and subtracts one of said video images from a time displaced video image.

27. An apparatus as in claim 26, wherein the processor forms a threshold and takes absolute values of the digital image data and compares the absolute values with a threshold.

28. An apparatus as in claim 24, wherein said processor calculates outlines of the local boundary curvature extremes before comparing the outlines of the local boundary curvature extremes with outlines of the stored model.

29. An apparatus as in claim 24, wherein said processor determines in the model normals to the outlines of the head and the portion of the body immediately below the head to identify the regions of a neck; and compares the outlines in the model with outlines in the differential figures.

30. An apparatus as in claim 24, wherein said device is a video display responsive to said processor for electronically placing the region in a desired position of an image.

31. An apparatus as in claim 24, wherein the portion of the body below the head is a neck.

32. An apparatus as in claim 24, wherein said device is a video display, said processor detects data from a subregion of a differential image corresponding a pattern of the human head and a portion of a body immediately below the head and transmits the data from the subregion to said video display.

33. An apparatus as in claim 32, wherein the video display displays said head.

34. An apparatus as in claim 32, further comprising a recorder for recording data of the head in said subregion.

35. An apparatus as in claim 24, said processor senses data from a subregion of one of said video images corresponding to a pattern of a human head and the portion of a body immediately below the head to transmit a human head and electronically produces the effect of a camera being manually pointed at the head.

36. An apparatus as in claim 35, wherein the device is a video camera responsive to said processor, and the processor in sensing the region points the camera to keep the head within the one of the video images.

37. An apparatus as in claim 32, said processor allocates a greater portion of transmission bandwidth to the subregion that contains the pattern of the head.

38. An apparatus as in claim 32, wherein the device includes a plurality of cameras and said processor when sensing selects one of said cameras on a basis of the sensing so as to use the camera with the pattern of the head in its field of view.

39. An apparatus as in claim 32, wherein the processor forms a computer input to permit rendering a three dimensional representation.

40. An apparatus as in claim 32, wherein the processor limits areas of the sensing to the subregion to permit increase of speed and efficiency of recognizing faces on the pattern of said head.

41. An apparatus as in claim 32, wherein the processor stores statistical data about motion and presence of patterns of heads in a scene.

42. An apparatus as in claim 24, wherein the processor centers the pattern of a head in a video picture.

43. An apparatus as in claim 24, wherein the processor places an image of the pattern of the head at a predetermined position in one of the video pictures.

44. An apparatus as in claim 24, wherein the processor subtracts immediately successive ones of said time displaced video images.

45. An apparatus as in claim 24, wherein the processor subtracts time displaced images separated from each other by a time τ and varies the time τ to adjust the figures.

46. An Apparatus as in claim 45, wherein said processor varies the time τ in response to manual operation.

47. A method as in claim 1, further comprising controlling a camera on the basis of said identifying step so as to place the head within a desired part of the image.

48. A method as in claim 1, further comprising electronically controlling a display on a basis of said identifying step so as to place the head within a desired part of the display.

49. An apparatus as in claim 24, wherein said device is a camera responsive to said processor for placing the region in a desired position in an image.

* * * * *